United States Patent [19]

Müller et al.

[11] Patent Number: 5,067,582

[45] Date of Patent: Nov. 26, 1991

[54] DRIVE ASSEMBLY FOR MOTOR VEHICLES

[75] Inventors: Robert Müller, Mönsheim; Egon Eisenhauer, Heimsheim, both of Fed. Rep. of Germany

[73] Assignee: Dr. Ing. h.c.F. Porsche AG, Fed. Rep. of Germany

[21] Appl. No.: 475,322

[22] Filed: Feb. 5, 1990

[30] Foreign Application Priority Data

Feb. 10, 1989 [DE] Fed. Rep. of Germany ....... 3903941

[51] Int. Cl.$^5$ .............................................. B60K 17/22
[52] U.S. Cl. ..................................... 180/380; 74/607; 180/381
[58] Field of Search ................... 74/607; 180/378, 380, 180/381, 291, 299, 382, 383

[56] References Cited

U.S. PATENT DOCUMENTS 1,243,862  10/1917  Olson .................................. 180/380

FOREIGN PATENT DOCUMENTS

| 556296 | 4/1958 | Canada ............................... 180/381 |
| 0032370 | 7/1981 | European Pat. Off. . |
| 0173898 | 3/1986 | European Pat. Off. . |
| 2843917 | 1/1980 | Fed. Rep. of Germany . |
| 3044288 | 6/1982 | Fed. Rep. of Germany . |

OTHER PUBLICATIONS

One sheet from the European Patent Office, 11/1985.
One-Page Office Action with Cited References: W. Hanisch, K. Stehle, Der Antriebsstrang des Porsche 928, in: ATZ 79 (1977), Heft 10, S. 459-462 and R. Sivers, R. Muller, Der Antriebsstrang des Posche 924, in: ATZ 78 (1976), Heft 6, S. 259-262.

Primary Examiner—Andres Kashnikow
Assistant Examiner—Michael Mar
Attorney, Agent, or Firm—Evenson, Wands, Edwards, Lenahan & McKeown

[57] ABSTRACT

A drive assembly for motor vehicles comprises a front power unit which is elastically supported at the vehicle body and which is rigidly connected with a rear drive unit by means of a center tube through which a drive shaft extends. The front area of the center tube has a low bending stress and is connected to the power unit. This front area of the center tube has at least one longitudinal slot which is axially limited in its length and which is arranged in a vertical longitudinal center plane of the center tube. The slot causes a reduction of the torsional rigidity while, at the same time, the bending rigidity of the center tube is maintained. As a result, the torsional natural frequency of the assembly is reduced so that torsional resonance and vibrations at the transmission line are avoided during the driving operation.

7 Claims, 2 Drawing Sheets

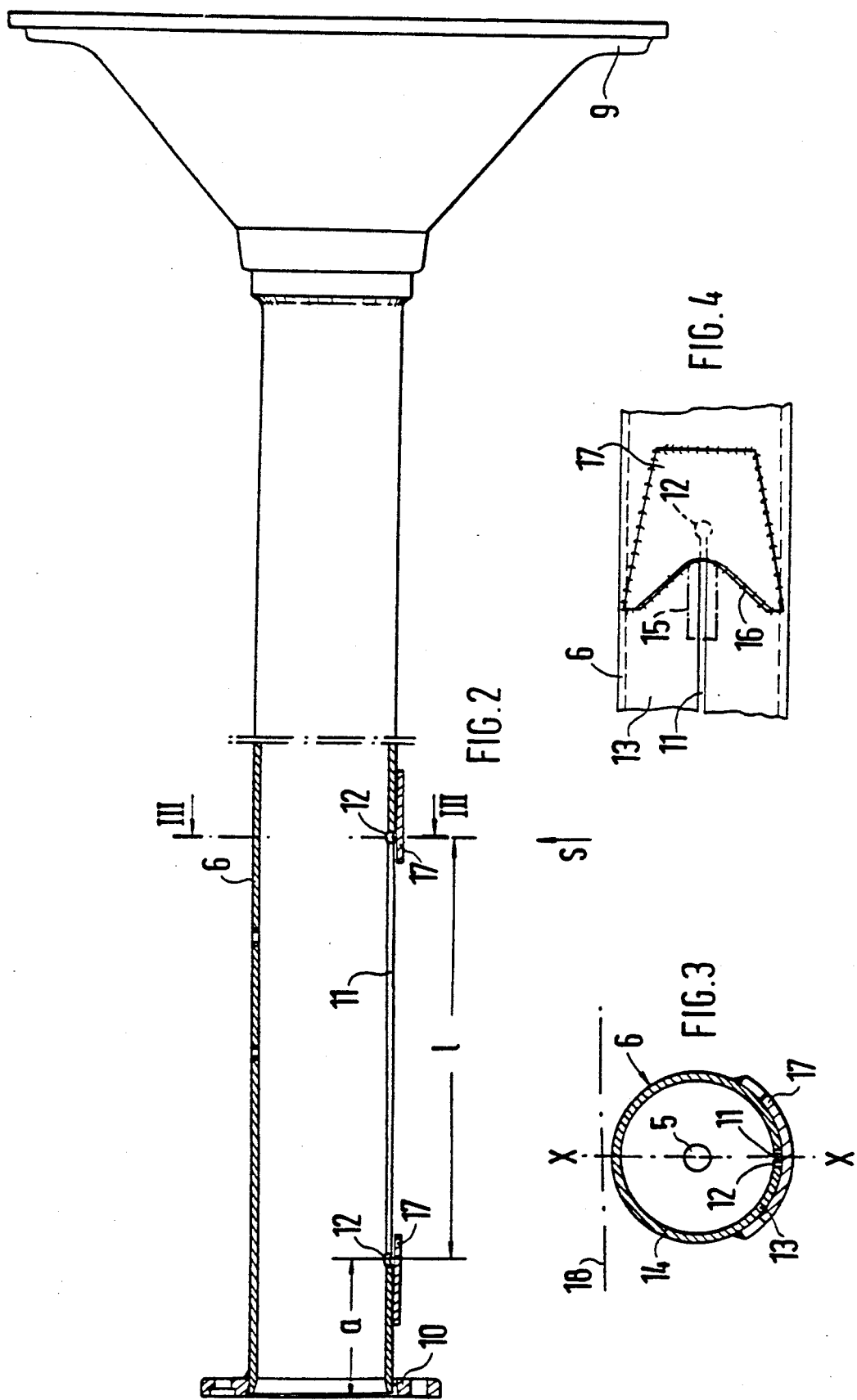

DRIVE ASSEMBLY FOR MOTOR VEHICLES

BACKGROUND AND SUMMARY OF THE INVENTION

The invention relates to a drive assembly for motor vehicles having a front power unit which is elastically supported at the vehicle body and which is rigidly connected with a rear drive unit by means of a center tube through which the drive shaft extends.

In a known drive assembly of this general type (DE-PS 28 43 917), the center tube is rigidly connected with the power unit on one side and with the rear drive unit on its other side. This rear drive unit is formed by a gear change box in the case of a transaxle construction. This type of rigid drive assembly vibrates in response to gas force excitations of the engine during a load operation as a result of a torsional resonance of the transmission line. Here the center tube acts as a torsion spring and the transmission acts as the torsional mass.

The invention is based on an object of providing a drive assembly for motor vehicles having a front power unit which is elastically supported at the vehicle body and which is rigidly connected with a rear drive unit by means of a center tube through which the drive shaft extends in which, despite a rigid connection of the center tube with the power unit and the rear drive unit, a lowering of torsional resonances and therefore vibrations can be extensively achieved.

According to the invention, this is achieved by having the center tube have at least one axially limited longitudinal slot in the front area of low bending stress which connects to the power unit.

It is also advantageous if the longitudinal slot is arranged in a vertical longitudinal center plane of the center tube and in a wall area of the center tube which faces away from the vehicle bottom. Alternatively, or additionally, a longitudinal slot can be arranged in a wall area of the center tube that faces the vehicle bottom. An end of the longitudinal slot is arranged to start at a distance spaced from a front fastening flange of the center tube, which flange connects the tube to the power unit. The longitudinal slot is designed relatively narrow and has a length which extends approximately along a third of the overall length of the center tube.

It is also advantageous if the longitudinal slot has two ends that are designed as bores and if these ends are each partially covered by a tab which is fixedly connected with the center tube. Ideally the tab has a curved edge that extends in the direction of the longitudinal slot and with a center closer to the end of the tube.

It is also advantageous if the longitudinal slot is fixedly or partially closed off by an adhesive tape.

The torsional rigidity of this drive assembly is reduced by a center tube provided with at least one longitudinal slot situated in the area of low bending stress and which is rigidly connected with the units of the drive assembly. The bending rigidity of the center tube is substantially maintained unchanged as a result of the position of the longitudinal slot in a vertical longitudinal center plane of the tube and in the area of low bending stress. As a result, the torsional natural frequency of the drive assembly is reduced so that a torsional resonance of the transmission line in the driving rotational speed range will no longer occur.

By means of the special arrangement of the longitudinal slot in the center tube, the torsional resonance of the transmission line is shifted from the vehicle engine driving rotational speed range (1,400 rpm to 2,000 rpm) into a rotational speed range below 1,000 rpm and thus disturbing vibrational influences during driving ranges are therefore avoided.

Other objects, advantages and novel features of the present invention will become apparent from the following detailed description of the invention when considered in conjunction with the accompanying drawings.

BRIEF DESCRIPTION OF THE DRAWINGS

FIG. 2 is a sectional representation of the center tube;

FIG. 3 is a sectional view according to Line III—III of FIG. 2;

FIG. 4 is a view of a reinforcing tab viewed in the direction of the arrow S of FIG. 2.

DETAILED DESCRIPTION OF THE DRAWINGS

Figure 1:
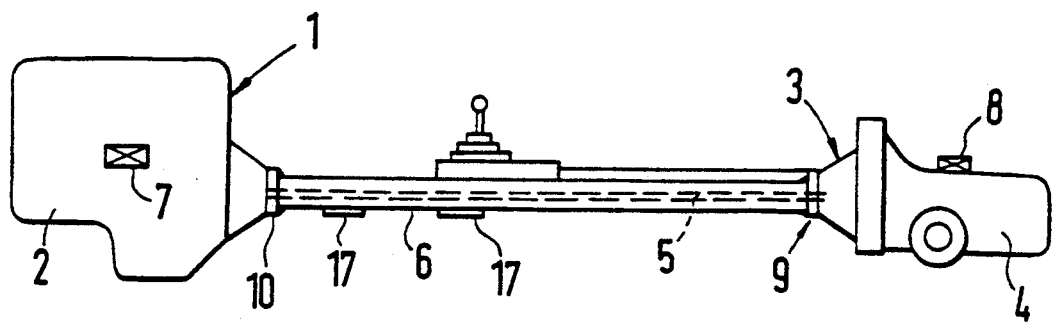
FIG. 1 is a schematic representation of a drive assembly with a center tube.

FIG. 1 shows a drive assembly of a motor vehicle which has a front power unit 1 and a rear drive unit 3. The rear drive unit 3 contains a transmission 4 which drives a rear axle and is in driving connection with the engine 2 of the front power unit 1 by way of a drive shaft 5 and a clutch. The power unit 1 is connected with the drive unit 3 by means of a center tube 6 which receives the drive shaft 5. The power unit 1 and the drive unit 3 are connected with the vehicle body or with front or rear cross members by means of elastic bearings 7 and 8. The center tube 6 is preferably flanged to the drive unit 3 at its rear-side 9 and is flanged to the power unit 1 at its front side 10.

The center tube 6 has a longitudinal slot 11 in the front area which connects to the power unit 1 and is axially limited in its length (1). This longitudinal slot 11 is provided in a vertical longitudinal center plane X—X of the center tube 6 and is preferably arranged in the wall area 13 of the tube 6 which faces away from the vehicle floor 18 (indicated in FIG. 3). This allows for the draining of any accumulating water in the center tube 6. There can also be a longitudinal slot in the center tube 6 which is arranged in the wall area 14 of the central tube 6 facing the vehicle floor 18. Additionally one could have two longitudinal slots, e.g. one adjacent the vehicle floor and the other on the bottom of the tube.

The longitudinal slot 11 has one end displaced a distance (a) from the flange 10 and extends in an area in which bending stress in the center tube 6 is as low as possible. Hence the strength of the center tube 6 is not impaired. The longitudinal slot 11 is relatively narrow, with a width of approximately 4 mm and a length of approximately 650 mm, wherein the overall length of the center tube 6 (measured from flange 9 to flange 10) is approximately 1,690 mm.

In order to counteract any formation of cracks at the ends of the longitudinal slot 11, this longitudinal slot 11 is configured to have a bore end 12 which forms a continuous curve connecting the two sides of the slot 11. At the same time, the slot 11 end areas are covered by tabs 17, which are connected with the center tube 6 such as by welding. The tab has a curved edge 16 which overlies the slot and has its center portion directed towards the end bore 12. An adhesive tape 15 (outlined in FIG. 4) covers the longitudinal slot 11 for a portion thereof, or throughout its length.

Figure 5:
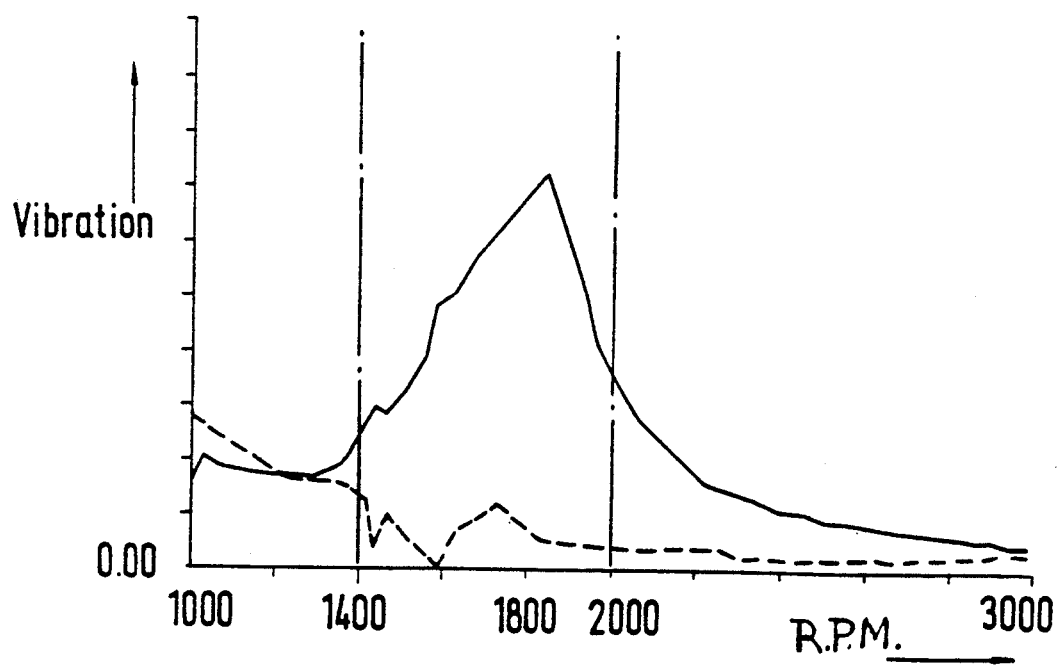
FIG. 5 is a diagram concerning the lowering of the vibrations in a comparison between a known closed center tube and a center tube with a longitudinal slot according to the invention.

FIG. 5 shows a diagram in which the occurring vibrations are shown over the course of the engine rotational speed for a closed center tube according to the state of the art (solid line) and a slotted center tube 6 (dashed line) according to the invention. In the critical driving rotational speed ranges of 1,400 to 2,000 rpm, high vibrations occur when the center tube 6 is closed. In contrast, when a center tube 6 is used which is provided with a longitudinal slot 11, the vibrations are significantly lower in the same driving rotational speed range. The vibration level in the idling rotational speed range around 1,000 rpm for the slotted center tube 6, and the closed center tube 6 is approximately the same.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A drive assembly for a motor vehicle having a vehicle body, a front power unit which is elastically supported on the vehicle body, and a rear drive unit, the drive assembly comprising:
   a center tube rigidly connected between the front power unit and the rear drive unit of the vehicle, a drive shaft extending through the center tube; wherein
   the center tube has at least one longitudinal slot which is adjacent to the front power unit, the slot having dimensions and configurations such that a torsional rigidity of the center tube is reduced, thereby reducing a torsional natural frequency of the drive assembly below a driving rotational speed range; wherein the longitudinal slot is axially limited in its length;
   wherein the longitudinal slot has two ends which have shapes and configurations for counteracting crack formation at the ends of the longitudinal slot; wherein
   these ends are partially covered by a tab which is fixedly connected with the center tube; and wherein
   this tab has a curved edge facing the central portion of the longitudinal slot.

2. A drive assembly according to claim 1, wherein the longitudinal slot is arranged in a wall area of the center tube which faces away from a bottom of the vehicle body.

3. A drive assembly according to claim 1, wherein the longitudinal slot is designed to be relatively narrow and has a length which extends approximately for a third of the overall length of the center tube.

4. A drive assembly according to claim 1, wherein the longitudinal slot is closed off by means of an adhesive tape.

5. A drive assembly for a motor vehicle having a vehicle body, a front power unit which is elastically supported on the vehicle body, and a rear drive unit, the drive assembly comprising:
   a center tube rigidly connected between the front power unit and the rear drive unit of the vehicle, a drive shaft extending through the center tube;
   wherein the center tube has at least one longitudinal slot which is adjacent to the front power unit, the slot having dimensions and configurations such that a torsional rigidity of the center tube is reduced, thereby reducing a torsional natural frequency of the drive assembly below a driving rotational speed range;
   wherein the longitudinal slot is axially limited in its length;
   wherein the longitudinal slot is arranged in a vertical longitudinal center plane of the center tube;
   wherein the longitudinal slot has two ends which have shapes and configurations for counteracting crack formation at the ends of the longitudinal slot; wherein
   these ends are each partially covered by a tab which is fixedly connected with the center tube; and wherein
   this tab has a curved edge facing the central portion of the longitudinal slot.

6. A drive assembly for a motor vehicle having a vehicle body, a front power unit which is elastically supported on the vehicle body, and a rear drive unit, the drive assembly comprising:
   a center tube rigidly connected between the front power unit and the rear drive unit of the vehicle, a drive shaft extending through the center tube; wherein
   the center tube has at least one longitudinal slot which is adjacent to the front power unit, the slot having dimensions and configurations such that a torsional rigidity of the center tube is reduced, thereby reducing a torsional natural frequency of the drive assembly below a driving rotational speed range;
   wherein the longitudinal slot is axially limited in its length;
   wherein the longitudinal slot is arranged in a wall area of the center tube facing the vehicle bottom;
   wherein the longitudinal slot has two ends which have shapes and configurations for counteracting crack formation at the ends of the longitudinal slot; wherein
   these ends are each partially covered by a tab which is fixedly connected with the center tube; and wherein
   this tab has a curved edge facing the central portion of the longitudinal slot.

7. A drive assembly for a motor vehicle having a vehicle body, a front power unit which is elastically supported on the vehicle body, and a rear drive unit, the drive assembly comprising:
   a center tube rigidly connected between the front power unit and the rear drive unit of the vehicle, a drive shaft extending through the center tube; wherein
   the center tube has at least one longitudinal slot which is adjacent to the front power unit, the slot having dimensions and configurations such that a torsional rigidity of the center tube is reduced, thereby reducing a torsional natural frequency of the drive assembly below a driving rotational speed range;
   wherein the longitudinal slot is axially limited in its length;
   further comprising front fastening flange means for providing a rigid connection of the center tube to the power unit, wherein an end of the longitudinal slot is arranged to be spaced at a distance from the front fastening flange means;

wherein the longitudinal slot has two ends which have shapes and configurations for counteracting crack formation at the ends of the longitudinal slot; wherein these ends are each partially covered by a tab which is fixedly connected with the center tube; and wherein this tab has a curved edge facing the central portion of the longitudinal slot.

* * * * *